US011938526B2

(12) United States Patent
Sanz Berzosa et al.

(10) Patent No.: US 11,938,526 B2
(45) Date of Patent: Mar. 26, 2024

(54) INSTALLATION INTENDED TO AUTOMATICALLY REMOVE LABELS OF CRATES

(71) Applicant: MIMASA WASHTECH, S.L.U., Girona (ES)

(72) Inventors: Ramiro Sanz Berzosa, Girona (ES); Simon Luque Ortega, Girona (ES); Conrad Fargas Casadevall, Girona (ES); Gerard Morell Pla, Girona (ES); Jordi Arevalo Sureda, Girona (ES); Albert Puxan Lidon, Girona (ES); Josep Masanas Pujol, Girona (ES); Marc Massanas Regalat, Girona (ES)

(73) Assignee: MIMASA WASHTECH, S.L.U., Girona (ES)

( * ) Notice: Subject to any disclaimer, the term of this patent is extended or adjusted under 35 U.S.C. 154(b) by 229 days.

(21) Appl. No.: 17/520,180

(22) Filed: Nov. 5, 2021

(65) Prior Publication Data

US 2022/0134392 A1 May 5, 2022

(30) Foreign Application Priority Data

Nov. 5, 2020 (EP) .................................... 20382958

(51) Int. Cl.
*B08B 9/093* (2006.01)
*B08B 3/02* (2006.01)
*B08B 9/08* (2006.01)

(52) U.S. Cl.
CPC .............. *B08B 9/083* (2013.01); *B08B 3/022* (2013.01); *B08B 2203/027* (2013.01); *B08B 2209/08* (2013.01)

(58) Field of Classification Search
CPC ...................................................... B08B 9/083
See application file for complete search history.

(56) References Cited

FOREIGN PATENT DOCUMENTS

| | | | |
|---|---|---|---|
| BE | 1005535 | A7 * | 9/1993 |
| DE | 10332443 | A1 * | 2/2005 |
| EP | 0824251 | A1 | 2/1998 |
| EP | 1477240 | A2 * | 11/2004 |
| EP | 2170534 | A1 | 4/2010 |
| EP | 3486589 | B1 * | 3/2021 |
| GB | 861993 | A | 3/1961 |
| JP | 2000-167504 | A * | 6/2000 |
| WO | 2008151621 | A1 | 12/2008 |

* cited by examiner

*Primary Examiner* — Jeffry H Aftergut
(74) *Attorney, Agent, or Firm* — Hayes Soloway PC

(57) ABSTRACT

Installation provided with at least one high-pressure circuit comprising at least one high-pressure pump and rotating nozzles attacking the four sides of crates in order to automatically remove labels, wherein the installation further comprises a low-pressure circuit able to clean the installation inwardly and to transport labels to specific filters so that stoppages are diminished and further able to recirculate the water of the high-pressure and low-pressure circuits, and wherein trolleys holding the crates are able to rotate by means of a predefined path on perimetral guides of the frame so that the jets of the nozzles attack the required walls of the crates on four sides.

6 Claims, 6 Drawing Sheets

INSTALLATION INTENDED TO AUTOMATICALLY REMOVE LABELS OF CRATES

CROSS-REFERENCE TO RELATED APPLICATIONS AND PRIORITY

This patent application claims priority from European Patent Application No. 20382958.5 filed Nov. 5, 2020. This parent application is herein incorporated by reference in its entirety.

OBJECT OF THE INVENTION

This invention is encompassed within the field of automatic installations or installations for removing labels or paper stuck or fastened onto any of the walls of a crate. More in particular, the present invention relates to an installation provided with at least one high-pressure circuit comprising at least one high-pressure pump and rotating nozzles attacking the four sides of the crates in order to automatically remove the labels. Furthermore, the present invention describes a low-pressure circuit able to clean the installation inwardly and transport the labels to specific filters so that stoppages are diminished. The installation is configured to hold the crates on trolleys which in turn are able to rotate by means of a predefined path on perimetral guides of the frame so that the jets of the nozzles attack the required walls in the most efficient way, and further configured to regulate acceleration and deacceleration and synchronizing speed, so that a nominal yield of 3000 crates per hour is able to be successfully achieved.

BACKGROUND OF THE INVENTION

Some installations for removing labels are known in the art. However, some drawbacks or disadvantages are therein found.

For example, installations known require a significant amount of stoppages as labels and impurities such as soils are not properly removed from the crate cleaning area and inside the tunnel damaging the system.

Additionally, dirtiness accumulates inwardly developing damages on the pieces and motors of the installations or requiring more maintenance, replacements and stoppages than necessary.

Furthermore, labels are not removed on all walls on a single one-way path inside the tunnel and they may need to be reintroduced more times so that labels are properly removed in all four walls.

Additionally, installation known in the state of the art are not fully automatized, with no regulation on the acceleration and deceleration of the crates to be cleaned, so that if a desynchronization occurs between the crates holding means at the inlet of the tunnel, the installation must be stopped and error must be fixed to continue. This drawback makes it necessary to have more operators to fix the crates on position and restarting the process continuously, harming productivity.

Furthermore, Installations known in the state of the art, use water in an open circuit wasting a significant amount of water in the process.

DESCRIPTION OF THE INVENTION

A new installation for automatically removing labels a from all walls multiple crates is herein disclosed with which it has been found that at least the above disadvantages relating to the prior art solutions are mitigated.

More in particular, there is provided a Installation intended to automatically remove labels stuck on crates, wherein said installation comprises:

- a frame comprising a front portion and a rear portion, wherein each portion comprises perimetral guides comprising a non-linear predefined path, and wherein each portion further comprises two round ends,
- a trolley operatively attached therebetween the front portion and the rear portion of the frame and operatively coupled to the perimetral guides so that said trolley go over the predefined path, said trolley comprising holding means adapted to grip the crates and to hold walls of said crates firmly,
- a conveyor belt operatively coupled to the trolley and to the perimetral guides so that said the conveyor belt is adapted to round-trip along each of the frame portions, wherein said conveyor belt is moved by at least one power system housed on one of the round ends and comprising a control system configured to control acceleration and deceleration of said conveyor belt,
- an upper structure upwardly attached to the frame, said upper structure comprising at least one door and forming an inward tunnel whereby the trolleys transit,
- a label removal installation provided with at least one high-pressure water circuit accessible from the outside by the at least one door and comprising at least:
  - a water tank,
  - at least a high-pressure pump operatively connected to said water tank,
  - a plurality of rotating high-pressure nozzles located inside the tunnel and fed by the high-pressure pump, said rotating high pressure nozzles able to discharge pressurized water at the four sides of each crate.

The installation with the aforementioned technical features has been found to be capable of removing labels of all four sides of the crates yielding a nominal speed of 3.000 units per hour.

Additionally, said installation is capable of managing different configuration of crates comprising different heights.

More in particular, the present invention provides a high-pressure circuit comprising a high-pressure pump and rotating nozzles attacking the four sides of the crates in order to automatically remove the labels.

Furthermore, the describes a low-pressure circuit able to clean the installation inwardly and transport the labels to specific filters so that stoppages are diminished.

The installation is configured to hold the crates on trolleys which in turn are able to rotate by means of a predefined path on perimetral guides of the frame so that the jets of the nozzles attack the required walls in the most efficient way, and further configured to regulate acceleration and deacceleration and synchronizing speed, so that a nominal yield of 3000 crates per hour is able to be successfully achieved.

Preferably, the installation is sized for removing labels and paper of 600×400 and/or 300×400 crates and able to be used with a wide range of unsorted heights of said crates.

The installation may comprise a plurality of lanes comprising conveyor belts and trolleys to hold each individual crate, therefore enhancing productivity. i.e. units done per unit of time.

In the aforementioned embodiment the frame comprises a plurality of portions operatively attached to a conveyor belt and trolleys, so that the tunnel is provided inwardly with a plurality of lanes for removing label and papers of crates.

In an alternative embodiment, instead of guides establishing a predefined path for the trolley travel, each trolley may be provided with a central pivotal axle rotated by an actuator to the required angle at each position of the path therebetween the tunnel inlet and outlet.

The high-pressure circuit may comprise at least one high-pressure pump sized above 150 bar which feeds two sets of rotating high-pressure nozzles which in turn target the four sides of the crates inside the tunnel.

In a preferred embodiment the high-pressure circuit may comprise a plurality of high-pressure circuits and a plurality of high-pressure pumps feeding corresponding sets of rotating high-pressure nozzles which in turn target the four sides of the crates inside the tunnel.

Preferably, the installation further comprises a centrifugal pump feeding the high-pressure pump so that a constant flow delivered to the high-pressure pump is achieved.

Furthermore, the installation may be provided with a low-pressure circuit installed inside the tunnel to deliver a constant flow of water intended to create a curtain of water inside the tunnel. Hence, this curtain of water is used to transport the labels (and impurities such as soil) to a specific filter therein installed. Additionally, this curtain will prevent flying labels to get stuck in the tunnel and will clean the trolleys and guides to prevent accumulation of labels on critical areas.

The low-pressure circuit allows to remove the labels removed and possible impurities out of the crate area and keeps the interior of the tunnel clean in order to maximize the operation time without stoppages.

In a preferred embodiment the high-pressure circuit and/or the low-pressure circuit may comprise a second stage with recirculated water, wherein the water output from said circuits falls by gravity on an opening operatively connected to the water tank.

Preferably, the installation comprises a solid filter therebetween the water tank and the opening for filtering particles from entering the water tank.

The water tank at the aspiration may comprises a protection filter.

In a preferred embodiment, the high-pressured circuit comprises a microfilter operatively installed prior to the high-pressure pump in order to feed and filter the recirculated water entering the high-pressure pump.

The water tank may be preferably provided with means for internal accessibility and located on a reachable location of the installation thereof.

Preferably, the tank comprises at least one rotatory filter for filtering the water before it is sucked by the pumps.

Note that the tunnel may comprise as many doors as required, so that all circuits are fully accessible from the outside.

In a preferred embodiment the upper structure comprises two wide doors with individual safety equipment on each of said doors.

The installation may also comprise at the inlet of the tunnel, an inlet installation comprising two lateral walls provided with clamping means to clamp an operating crate laterally, wherein said lateral walls are adapted to block a previous crate from passing. Hence, the inlet installation may comprise a linear motor to move the operating crate linearly until delivering the operating crate to a corresponding trolley thereof.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

A Detailed Explanation of an Example of Preferred Embodiment of the Object of the Present Invention is Provided Below, with the Aid of the Aforementioned Figures

Figure 1:
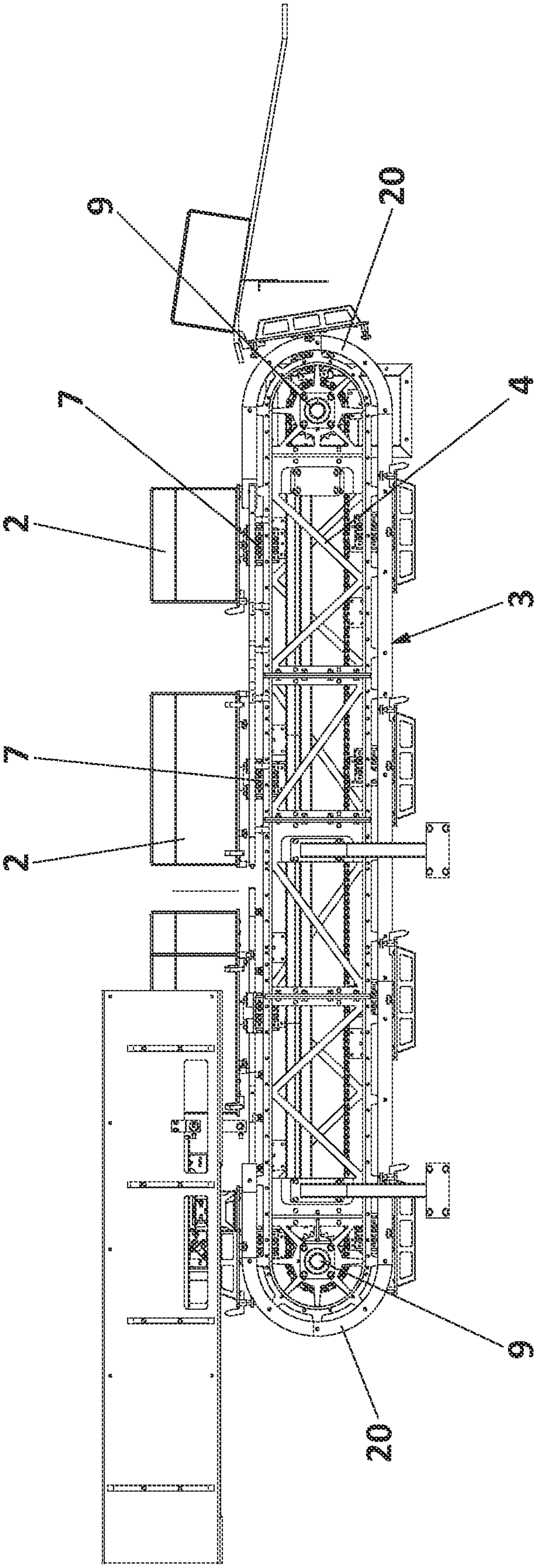
FIG. 1.—Shows a frontal view of a preferred embodiment of the invention, illustrating the frame comprising round portions and crates operatively attached to corresponding trolley.
Figure 2:
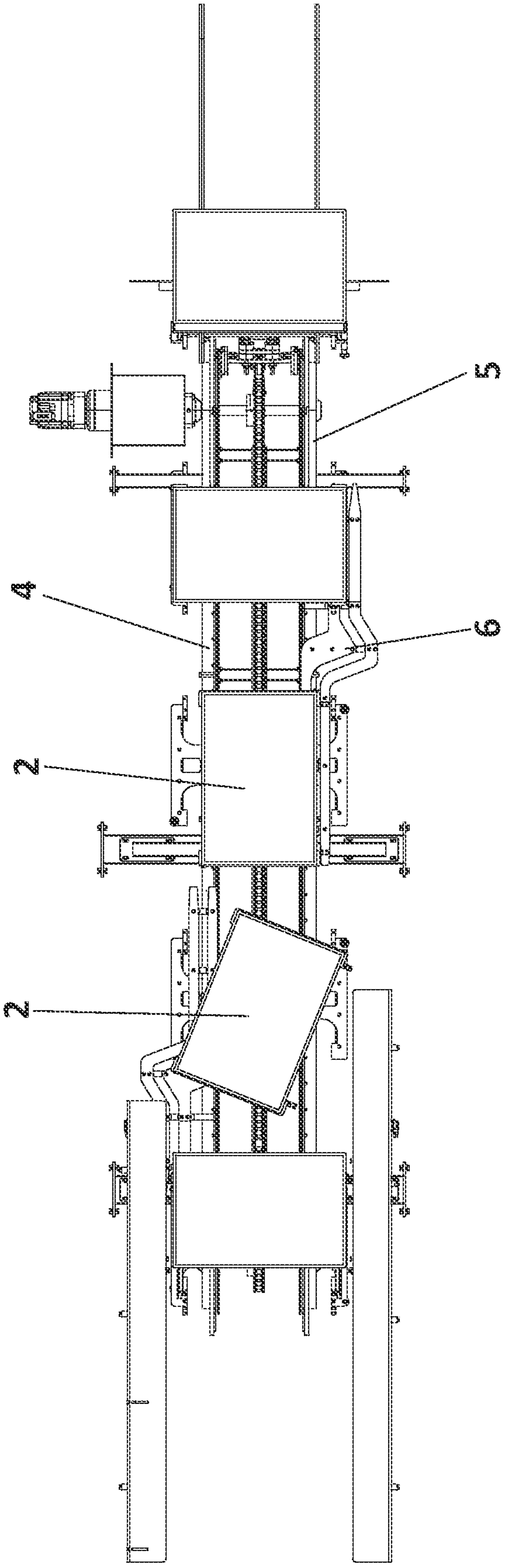
FIG. 2.—Shows an upper view of the preferred embodiment of the invention, illustrating the perimetral guides wherein the trolleys are operatively attached.

FIG. 1 Illustrates a Frontal View of a Preferred Embodiment of the Invention Wherein it is Shown that the Installation (1) Comprises a Frame (3) Comprising in Turn Two Portions (4,5) as Shown in FIG. 2 and Wherein Each Portion (4,5) Comprises Round Ends (20)

FIG. 1 also illustrates four trolleys (7) operatively attached therebetween the front portion (4) and the rear portion (5) of the frame (3), wherein each trolley (7) comprises holding means adapted to grip the crates (2) and further able to hold the crate (2) walls firmly, FIG. 2 illustrates an upper view of the preferred embodiment of the invention wherein it is shown that the frontal portion (4) and rear portion (5) of the frame (3) comprises perimetral guides (6) provided with a predefined path whereby the trolleys (7) travel.

The trolleys (7) are operatively fixed to the frame (3) and comprises a projection adapted to fixe on the perimetral guides (6) so that the trolley (7) follow the defined path.

Furthermore, FIG. 2 illustrates a conveyor belt (8) operatively coupled to the trolley (7) and to the perimetral guides (6) so that the conveyor belt (8) is adapted to round-trip along each of the frame portions (4,5).

As shown in FIG. 1 the conveyor belt (8) is moved by at least one power system (9) housed on one of the round ends (20), said power system (9) further comprising a control system configured to control acceleration and deceleration of said conveyor belt (8) and to set a synchronization speed.

Figure 3:
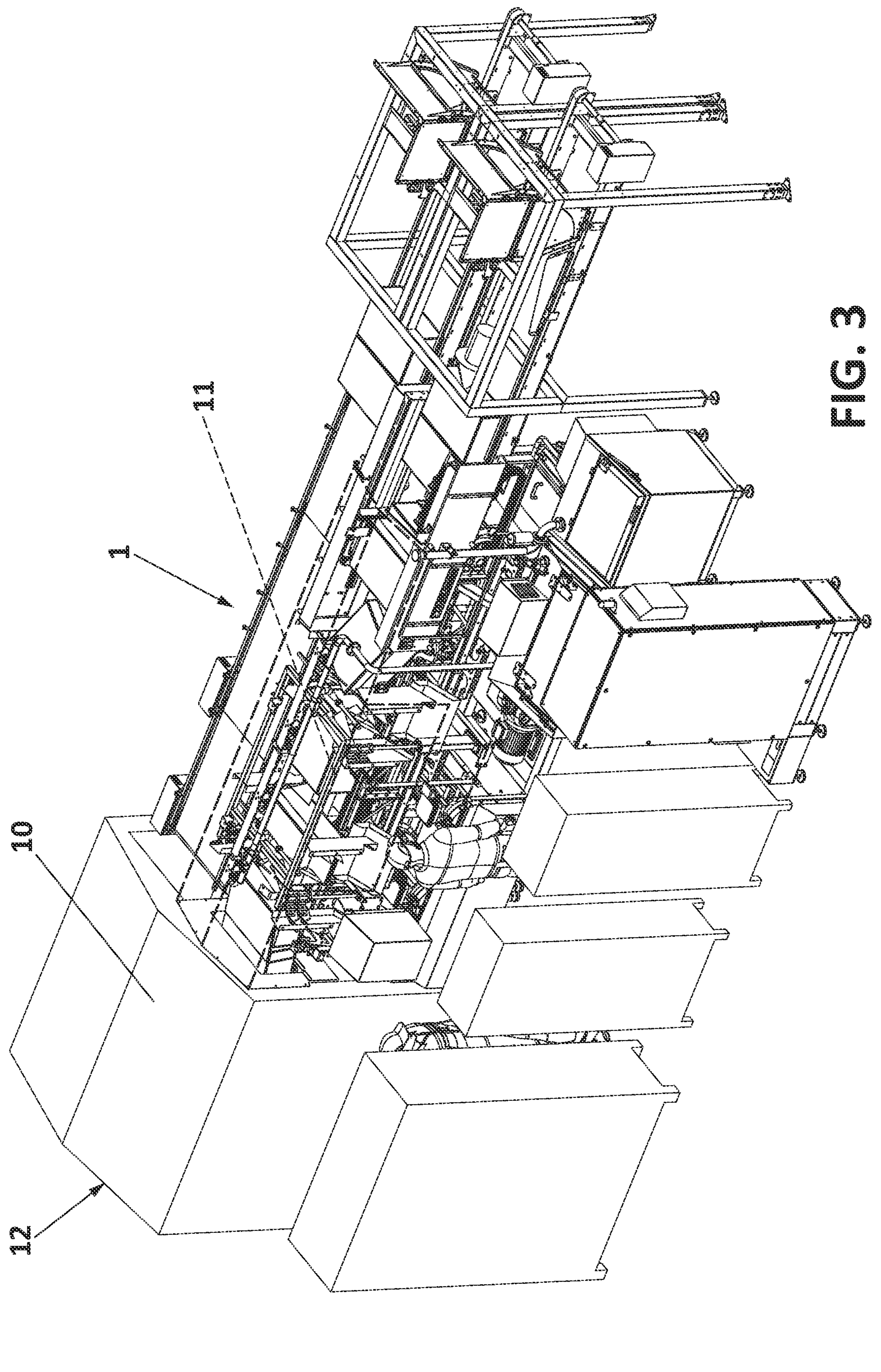
FIG. 3.—Shows a perspective view of the preferred embodiment of invention, illustrating the installation comprising an upper structure operatively coupled to the frame.

FIG. 3 illustrates an upper structure (10) upwardly attached to the frame (3), said upper structure (10) comprising at least one door (11) and an inward tunnel (12) whereby the trolleys (7) transit.

Figure 4:
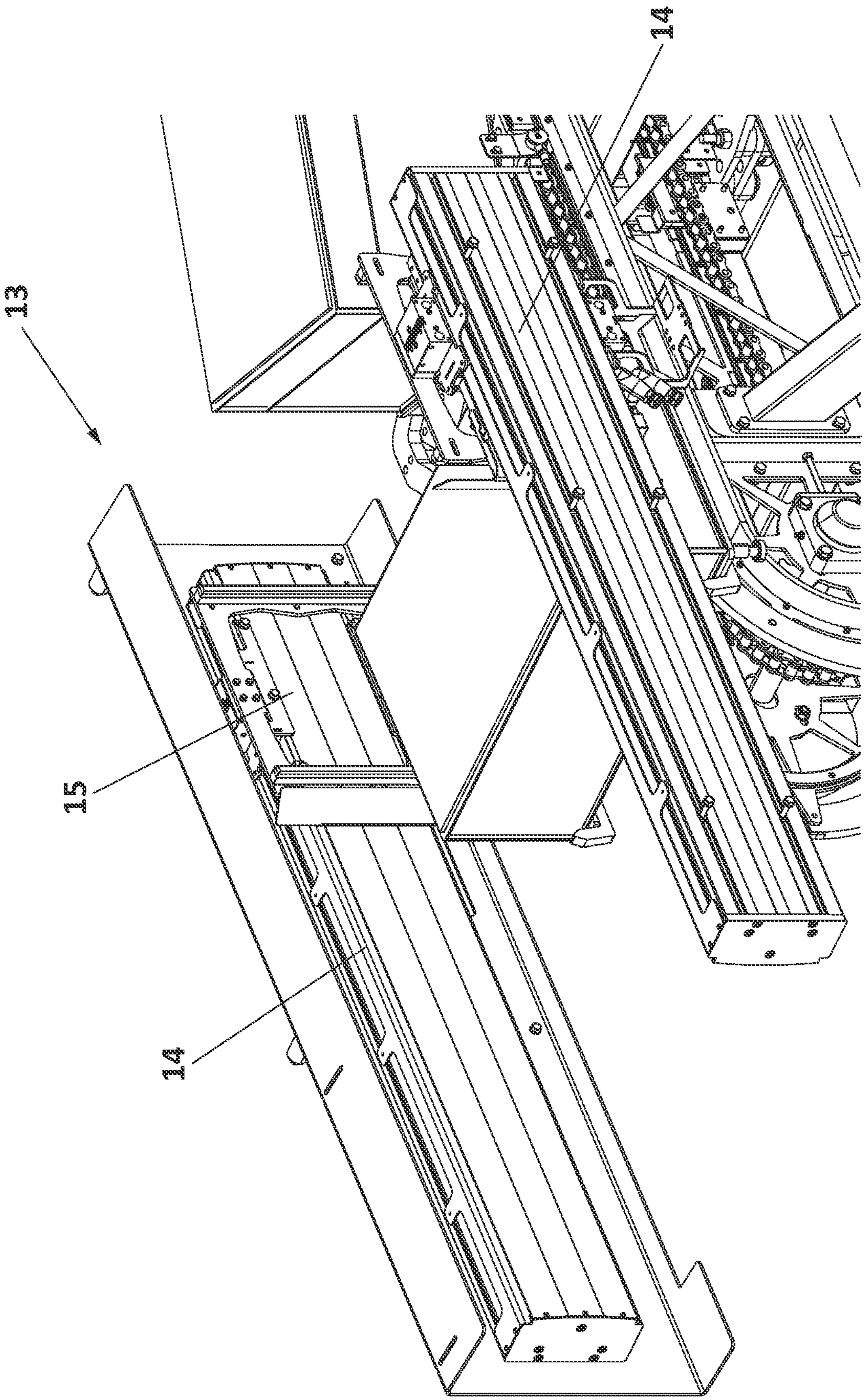
FIG. 4.—Shows a lateral view of a preferred embodiment of the inlet device comprising clamping means.

FIG. 4 illustrates a lateral view of a preferred embodiment of an inlet device (13) comprising two lateral walls (14) provided with clamping means (15) to clamp on the side walls of an crate (2) wherein said inlet device (13) further comprises a linear motor to move the crates (2) linearly until reaching a trolley (7) and delivering the crate (2) to said trolley (7) thereof.

Figure 5:
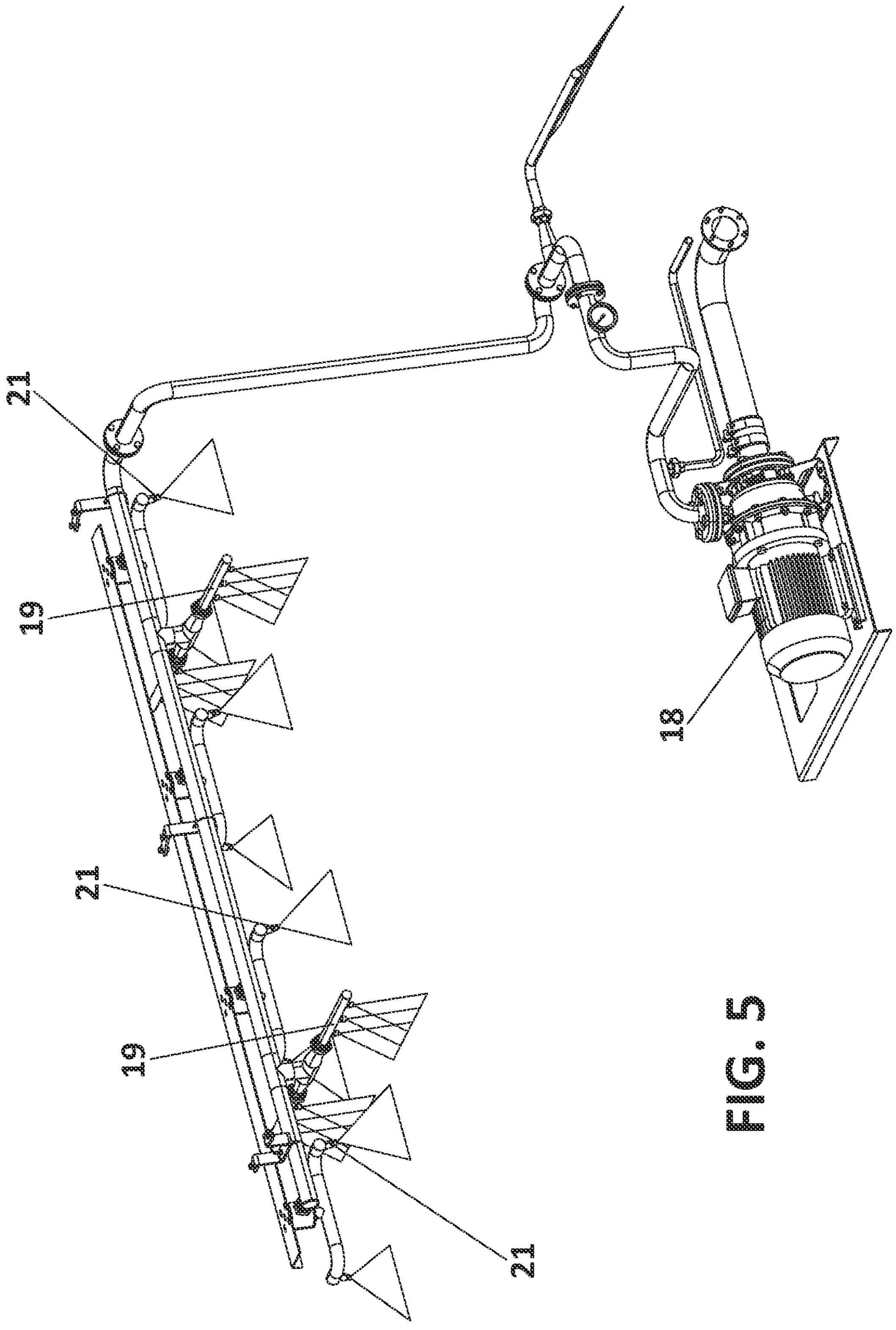
FIG. 5.—Shows a perspective view of a preferred embodiment of the rotating high-pressure nozzles fed by a high-pressure pump (18) and further shows the low-pressure circuit and low-pressure nozzles.
Figure 6:
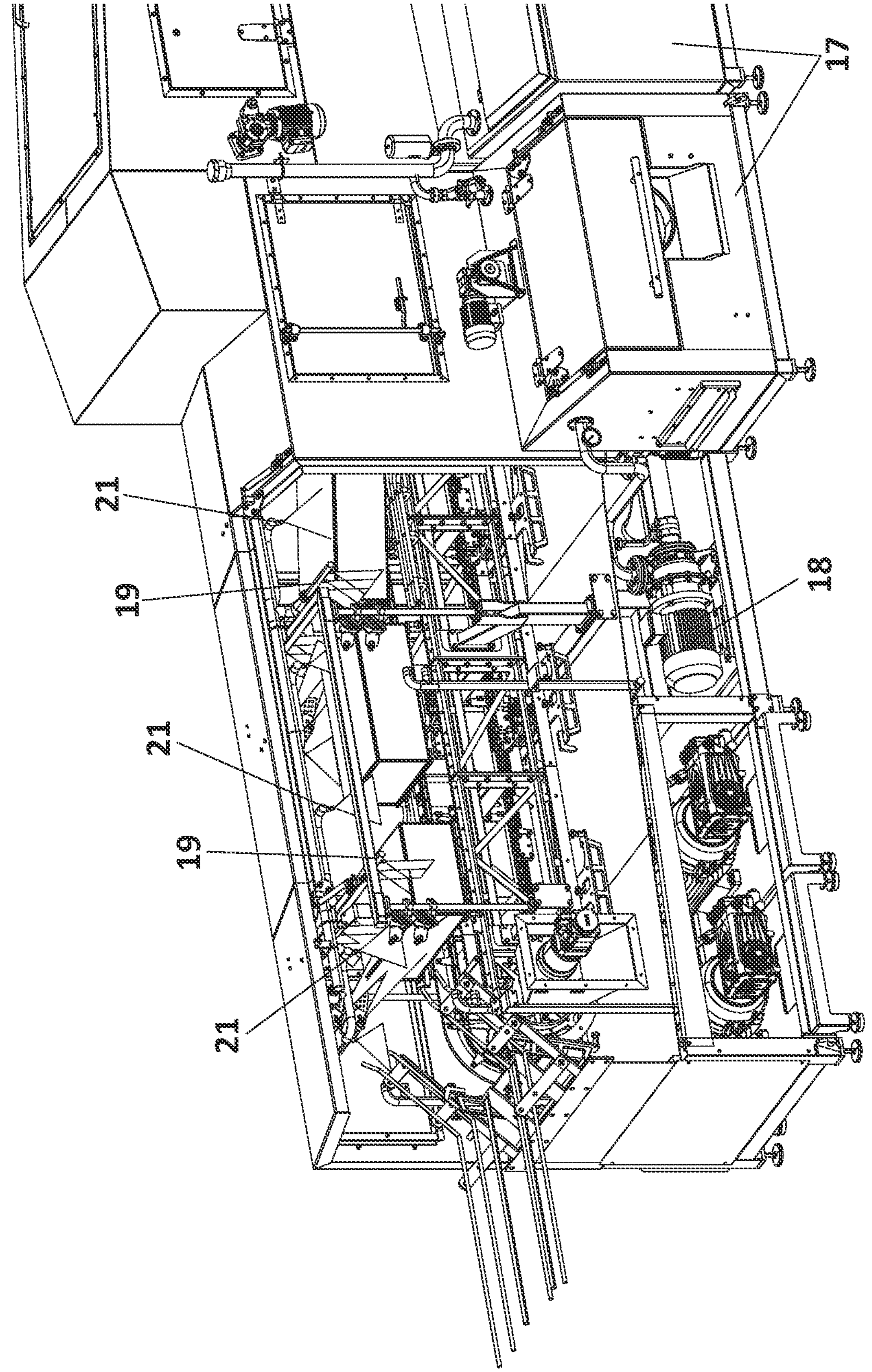
FIG. 6.—Shows a perspective view of the installation according to the invention, wherein it is shown the rotating high-pressure nozzles, the low-pressure nozzles, the high-pressure pump and a water tank.

FIG. 5. shows a perspective view of a preferred embodiment, wherein it is shown that the installation further comprises a plurality of rotating high-pressure nozzles (19) located inside the tunnel (12) as shown in FIG. 6, and fed by the high-pressure pump (18), said rotating high pressure nozzles (19) adapted to discharge pressurized water at the four sides of each crate (2).

Additionally, FIG. 5 illustrates that the installation in a preferred embodiment further comprises a low-pressure circuit and low-pressure nozzles (21) installed inside the tunnel (12) as shown in FIG. 6, said low-pressure nozzles (21) delivering a constant flow of water intended to create a curtain of water.

In the preferred embodiment the high-pressure circuit and/or the low-pressure circuit may comprise a second stage with recirculated water, wherein the water output from said circuits falls by gravity on an opening operatively connected to the water tank (17).

FIG. 6 shows a perspective view of the installation of the preferred embodiment of the invention, wherein it is shown the aforementioned nozzles (19,21) inside the tunnel (12). More in particular, wherein a label removal device is provided with a high-pressure water circuit accessible from the outside by the at least one door and comprising at least:

- a water tank (17),
- a high-pressure pump (18) operatively connected to said water tank (17),
- a plurality of rotating high-pressure nozzles (19) located inside the tunnel (12) and fed by the high-pressure pump (18), said rotating high pressure nozzles (19) adapted to discharge pressurized water at the four sides of each crate (2).

The invention claimed is:

1. Installation intended to automatically remove labels of crates, wherein said installation comprises:

- a frame comprising in turn a front portion and a rear portion, wherein each of said portions comprises a perimetral guides provided with a non-linear predefined path, and wherein each portion further comprises two round ends,
- at least one trolley operatively attached therebetween the front portion and the rear portion of the frame and operatively coupled to the perimetral guides so that said trolley travels along the predefined path, whereby said trolley is adapted to grip the crates and to hold the crates firmly,
- a conveyor belt operatively coupled to the trolley and to the perimetral guides so that the conveyor belt is adapted to round-trip along each of the frame portions,
- a power system housed on one of the round ends and connected to the conveyor belt wherein said power system moves the conveyor belt and comprises a control system configured to control acceleration and deceleration of the movement of the conveyor belt,
- an upper structure upwardly attached to the frame, said upper structure comprising at least one door and an inward tunnel whereby the trolleys transit,
- a label removal device provided with at least one high-pressure water circuit accessible from the at least one door, wherein said high-pressure water circuit comprises at least:
  - a water tank,
  - at least a high-pressure pump operatively connected to said water tank,
  - a plurality of rotating high-pressure nozzles located inside the tunnel and fed by the high-pressure pump, said rotating high pressure nozzles adapted to discharge pressurized water at the crates.

2. The installation of claim 1, further comprising a low-pressure circuit and low-pressure nozzles installed inside the tunnel and delivering a constant flow of water intended to create a curtain of water.

3. The installation of claim 2, wherein the high-pressure circuit and/or the low-pressure circuit may comprises a second stage with recirculated water and the water tank comprises an opening wherein water output from said circuits falls by gravity through the opening to the water tank.

4. The installation of claim 1, further comprising an inlet device comprising two lateral walls provided with a clamp to clamp the crate, wherein said inlet device further comprises a linear motor to move the crates linearly until reaching a trolley and delivering the crate to said trolley thereof.

5. The installation of claim 1, wherein the tunnel comprises a plurality of lanes for removing labels of the crates.

6. The installation of claim 1, further comprising a centrifugal pump connected to the high-pressure pump, wherein said centrifugal pump is intended to feed the high-pressure pump in order to ensure a constant liquid is delivered to said high-pressure pump.

* * * * *